A. DE KHOTINSKY.
TEMPERATURE CONTROL MECHANISM.
APPLICATION FILED JUNE 18, 1914.
1,184,430.
Patented May 23, 1916.
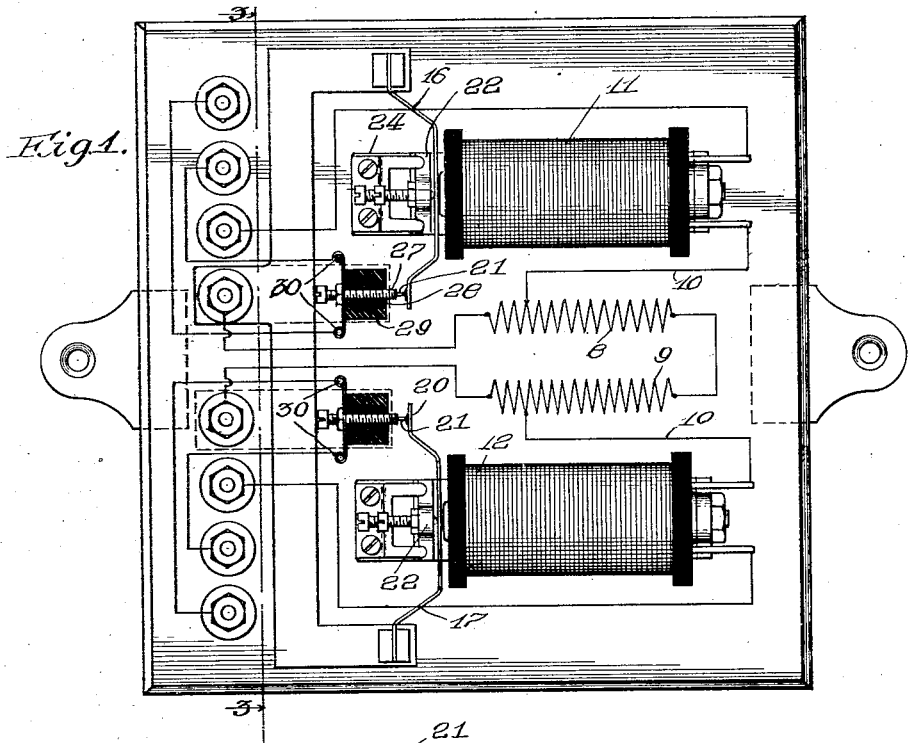
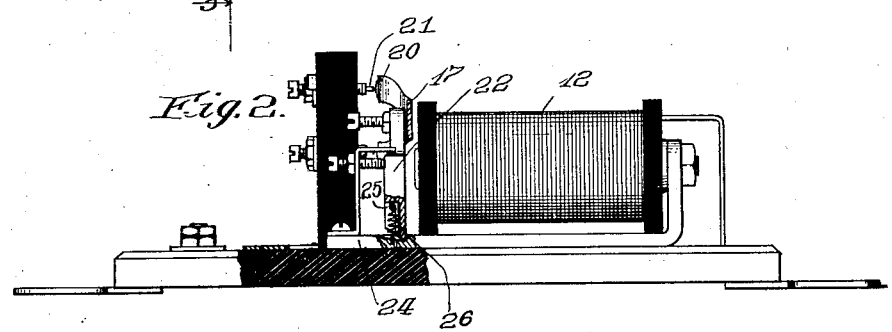
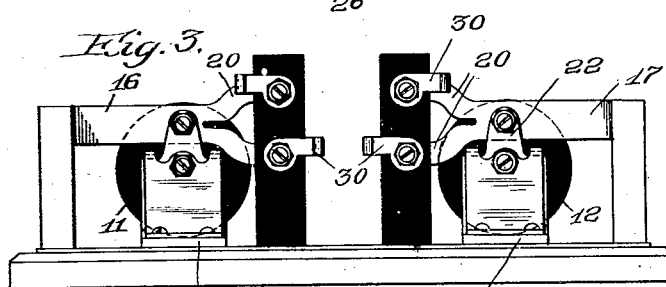
Inventor
Achilles de Khotinsky A. DE KHOTINSKY.
TEMPERATURE CONTROL MECHANISM.
APPLICATION FILED JUNE 18, 1914.
1,184,430.
Patented May 23, 1916.
2 SHEETS—SHEET 2.
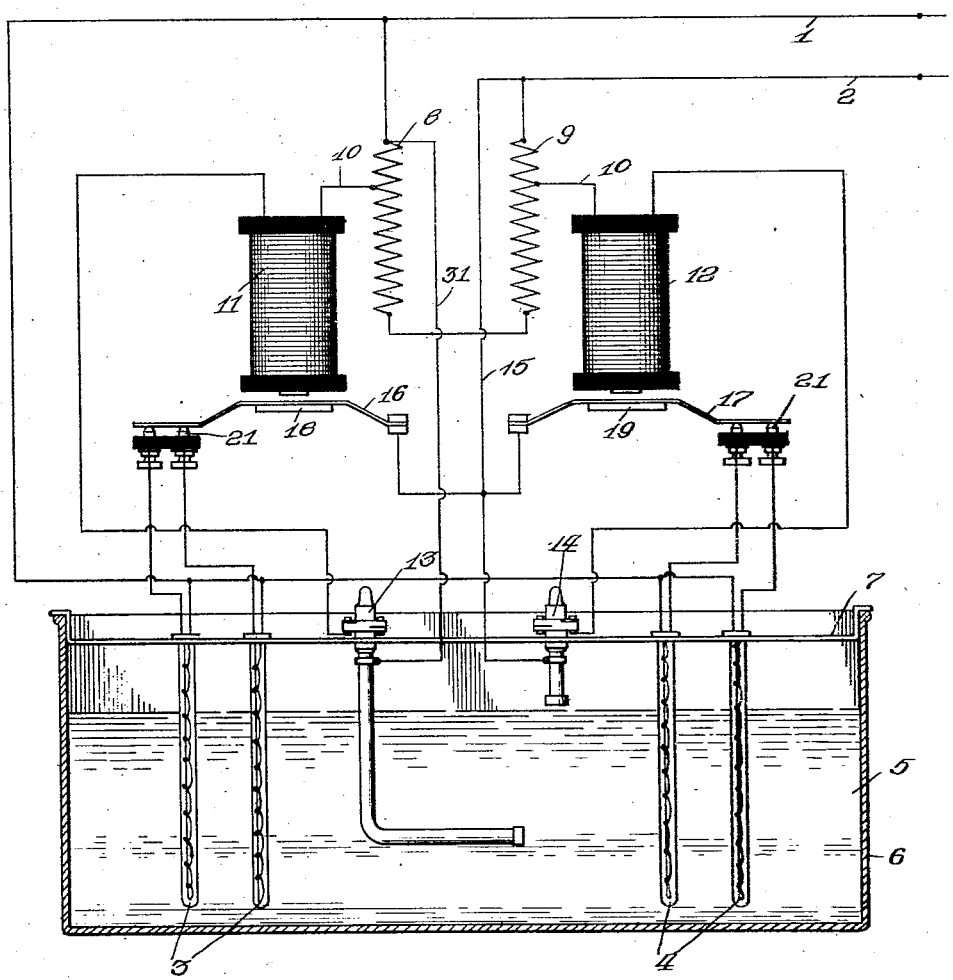
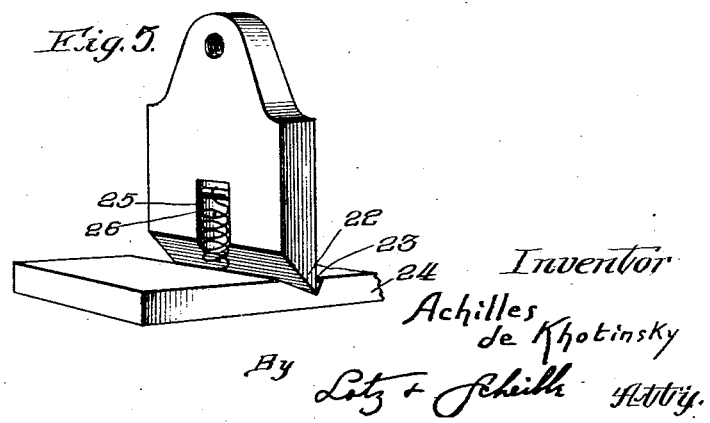

ns"
UNITED STATES PATENT OFFICE.

ACHILLES DE KHOTINSKY, OF CHICAGO, ILLINOIS, ASSIGNOR TO CENTRAL SCIENTIFIC COMPANY, OF CHICAGO, ILLINOIS, A CORPORATION OF ILLINOIS.

TEMPERATURE-CONTROL MECHANISM.

1,184,430.   Specification of Letters Patent.   Patented May 23, 1916.

Application filed June 18, 1914. Serial No. 845,813.

*To all whom it may concern:*

Be it known that I, ACHILLES DE KHOTINSKY, a citizen of the United States, residing at Chicago, in the county of Cook and State of Illinois, have invented certain new and useful Improvements in Temperature-Control Mechanisms; and I do hereby declare the following to be a full, clear, and exact description of the invention, such as will enable others skilled in the art to which it appertains to make and use the same.

My invention relates to electrical mechanisms for controlling temperatures, being particularly suited for use in connection with constant temperature baths and for use in connection with the extremely sensitive circuit-closing thermostat described in my copending application filed June 6, 1914 as Serial Number 843547, in which the current is opened or closed by the expansion or contraction of mercury within a tube of very small bore. In using such sensitive thermostats, the difficulties due to sparking at the mercury contact are greatly increased, as a small amount of the oxid of mercury produced by the spark will clog the bore and interfere with the sensitive operation of the device. Even if the thermostat is operated by batteries, the self-induction in the magnetic switches or relays commonly used in connection with such thermostats will cause too great an amount of sparking to make such apparatus dependable in operation. Besides, the use of batteries involves a steady watching of their voltage, as the accuracy in maintaining the temperature of a bath constant to within minute fractions of a degree requires a much more frequent operation of the mechanism than is demanded by a less sensitive temperature control; consequently, the batteries will deteriorate rapidly and if unexpectedly exhausted, they may easily put the apparatus out of commission and spoil the results for which the bath was intended.

One object of my invention is to provide a control mechanism which will permit of such an extremely sensitive operation without causing injurious sparking within the thermostat tubes; which may be connected directly to the source of electricity supplying the current for the heaters immersed in the baths, thereby avoiding all use of batteries; and which will afford large current-carrying capacity for the said heaters without damaging the contacts at which either the heating or the regulating currents are made and broken.

Another object is to provide a mechanism which will automatically compensate for variations in temperature both within the liquid of the bath and in the air of the room surrounding the bath.

Still another object is to provide means for insuring a good magnetic connection between the pivoted armatures of the actuating magnets and the adjacent fixed portions of the magnetic circuit regardless of the position in which the said magnets may be mounted.

I accomplish these objects by the construction shown in the accompanying drawing, in which:

Figure —1— is a plan view, partly in section and partly diagrammatic, of an electrical control mechanism embodying a part of my invention. Fig. —2— is a fragmentary side elevation of the same. Fig. —3— is a transverse section through Fig. —1— along the line 3—3. Fig. —4— is a sectional view of a constant temperature bath and a partially diagrammatic view of the control mechanism of my invention as connected thereto. Fig. —5— is an enlarged detail view of the armature of one of the magnets and a portion of the adjacent magnet frame.

In the embodiment of Fig. —4—, my invention is shown as used in connection with the terminal wires 1 and 2 of an ordinary lighting circuit, one of which wires is permanently connected to one terminal of each of a plurality of heating elements 3 and 4 immersed in the liquid of a bath 6, the said elements being supported by a suitable bracket or strip 7. The strip 7 also supports a thermostat 13 having its main portion immersed in the liquid 5 of the bath and a thermostat 14 exposed to the air of the room but not immersed in the said liquid. The thermostats used may be of any suitable type, but are here pictured in the form corresponding to my copending application. The other terminals of the heating elements, which elements are arranged in two distinct groups 3 and 4, I connect respectively to independent contact tips 21, the tips connected to the heating elements of each group being insulated from each other but disposed in proximity to each other with the extreme tip portions preferably disposed in substantially the same plane. Positioned near the said tips of the said contact terminals and connected respectively to the two groups of heating elements are movable contact members 16 and 17, both of which contact members are permanently connected by a wire 15 to the current-supply wire 2. The movable contact members 16 and 17 are preferably equipped with multi-forked ends 20 providing independent forks adapted to contact respectively with the said free terminals 21 of the heating elements, so that when each of the said movable contact members is in the position of Fig. —4—, it will simultaneously close the circuit through all of the corresponding heating elements, which will thus be connected in multiple to the current-supply circuit.

To manipulate the movable contact members 16 and 17 I associate therewith the armatures 18 and 19 of magnets 11 and 12 controlled respectively by the said thermostats 13 and 14. The winding of each of these electro-magnets is connected in series with the corresponding thermostat and with a suitable low voltage supply of current, for which purpose I preferably utilize a low voltage and low-amperage current derived from the supply circuit as shown in Fig. 4. To obtain the same, I bridge a pair of resistances 8 and 9 in series across the supply wires 1 and 2, the said resistances being so high as to permit the voltage of the circuit to force only a quite small volume of current through the same. I then include each of the said magnets and the corresponding thermostat in series in a circuit shunting a small portion of the resistance member formed by the joint resistance of the elements 8 and 9, so that each of the said magnets will be subject to only a small fraction of the voltage of the supply circuit and to only a portion of the volume of current flowing through the said resistances. The extreme tip portions of the contact tips 21 (which portions are made of platinum, tungsten or other relatively non-sparking metal) are preferably mounted upon finely threaded screws 27 threaded into metal bushings 28, which bushings in turn are carried by vertical posts 29 of slate or other suitable insulating material. I then connect the other end of the adjusting screws 27 to suitable conducting strips 30 (as shown in Fig. 1), through which the circuit is continued as shown diagrammatically in Fig. —4—.

In operation, Fig. 4 shows both magnets as closing the circuit through the heating elements, so as to supply an increase of temperature to the liquid in the bath. As soon as the liquid reaches the temperature for which the thermostat 13 is adjusted, the circuit will be closed by the said thermostat through the magnet 11, thereby causing the latter to attract its armature 18 and open the circuit through the heaters 3, after which the said circuits will be kept open by the attraction of the magnet 11 for its armature until the temperature in the bath decreases and opens the circuit in the thermostat 13. When this occurs, the magnet 11 releases its armature 18, thereby allowing the bifurcated contact 16 to close the circuit again through the heating elements 3. Likewise, the companion thermostat 14 will cause the magnet 12 to be actuated in response to variations in the temperature of the surrounding air thereby controlling the companion heater elements 4. Instead of pivoting each of the said armatures 18 and 19 upon rock shafts, I preferably equip them at one end with knife-edge formations 22 adapted to engage V-shaped notches 23 in the adjacent portion 24 of the magnet circuit of the magnet; that is to say, the said notch in each case is formed in an iron bar connected to one end of the core of the magnet and extending alongside the magnet past the other end of the said core. When such a knife-edge and slot formation is used in a horizontal position, as shown in Fig. —5—, the knife-edge is easily maintained in operative position by gravity, unless the mechanism is severely jarred. However, if the magnet is jarred or if the apparatus is so disposed that the bar 24 will occupy a vertical instead of a horizontal position the armature may slide with respect to the notch in the adjacent bar and in the case of an apparatus like mine, the contact members 16 may then support the said armature floatingly upon the terminals 21 independent of the said notch 23, thereby interrupting the magnetic circuit. To avoid this, I equip each armature with a recess 25 housing a spiral spring 26 connected at one end to the said armature and at its other end to the bar 24 and continuously by drawing the said knife-edge formation into the said slot so as to maintain a suitable magnetic connection between the said parts. By connecting one terminal of each of the heating elements constituting one of the said groups to contact tips carried by finely threaded screws, I am able to adjust these tips with respect to each other and to the adjacent forks of the movable contact member so that the contact through the respective forks of the said member will be made or broken successively of each other.

In practice, I have found that owing to the difference in the ionization of the air at the respective contacts, the contacting of the respective tip and fork portions will not be simultaneous even if the adjustment would visually imply that the action should be simultaneous. Consequently, by thus equipping the movable contact member with independent forks, I am able to provide a successive opening or closing of the respective circuits through the heating elements of a group while only providing a very slight movement of the movable member and the armature associated threwith. By thus restricting the said movement of the armature, I reduce the self-induction in the magnet and thereby avoid the injurious sparking which as heretofore been encountered within the thermostat tubes when operated with other control mechanisms. Moreover, by sub-dividing the heating means into a number of elements connected in multiple and each consuming relatively small amounts of current, I greatly decrease the danger of burning the contacts between the members 16 and 21 and the members 17 and 21, upon the opening or closing of the circuit.

Where the bath in which the temperature is to be controlled is relatively large, the number of heating elements comprised by each of the two groups and the corresponding division of the current through the same may be increased by increasing the number of contact forks upon the movable current-carrying member actuated by the armature of each magnet. Moreover, it will be obvious that the various details herein disclosed might be modified in many other ways without departing from the spirit of my invention. For example, if the available voltage is comparatively low, the resistance member may be omitted and connections made by wires 31, as shown in Fig. —4—.

I claim as my invention:

1. Heating apparatus, comprising in combination with a pair of current supply wires; a plurality of electric heating elements having one terminal of each permanently connected to one of the said wires, the other terminals thereof connected respectively to independent contact tips; a movable contact member equipped with a plurality of contact portions adapted respectively and successively to contact with the said contact tips; a thermostatic circuit closer; an electro-magnet operatively connected to the said contact member; and a source of current connected in series with said thermostat and the winding of said electro-magnet.

2. Heating apparatus, comprising in combination with a pair of current supply wires and a bath, a plurality of electric heating elements disposed in said bath, one terminal of each of said heating elements permanently connected to one of the said wires, the said heating elements arranged in two groups; the other terminals of the heating elements connected respectively to independent contact tips, the contact tips connected to each group of heating elements being disposed in proximity to each other; a pair of independently movable contact members permanently connected to the other of the said wires and presenting contact portions adapted successively to impinge respectively against the contact tips of the respective groups; a resistance member bridged across the said wires; a pair of circuit closing thermostats subject respectively to the temperature of the bath and the temperature outside of the said bath, one terminal of each being jointly connected to one of the said wires; and a pair of electro-magnets operatively connected respectively to the said movable contact members, the windings of each magnet connected respectively in series with one of said thermostats in a circuit shunting a portion of the said resistance.

3. Heating apparatus, comprising in combination with current supply wires and a bath, a plurality of electric heating elements having one terminal of each permanently connected to one of the said wires; a plurality of contact tips insulated from each other and connected respectively to the other terminals of the said heating elements; a thermostatic circuit-closer subject to the temperature of the said bath and having one terminal thereof connected to the other of the said wires; a resistance bridged across the said wires; a movable contact member permanently connected to the last-named wire and equipped with contact portions adapted respectively and successively to contact with the said contact tips; and an electro-magnet operatively connected to the said movable contact member, the ends of the windings of said magnet connected respectively to the other terminal of the said thermostatic circuit-closer and to the said resistance intermediate of the ends of the latter, whereby the said winding and the terminals of the said thermostatic circuit-closer are in a circuit shunting a portion of the said resistance.

4. Heating apparatus, comprising in combination with a pair of current supply wires, a resistance bridged across the said wires; a plurality of electric heating elements having one terminal of each permanently connected to one of the said wires, the other terminals thereof connected respectively to independent contact tips; a movable contact member equipped with a plurality of contact portions adapted respectively and successively to contact with the said contact tips; a thermostatic circuit closer; and an electro-magnet operatively connected to the said contact member, the winding thereof and the said thermostat connected in series in a circuit shunting a portion of the said resistance.

5. Heating apparatus, comprising in combination with a pair of current supply wires, a plurality of electric heating elements having one terminal of each permanently connected to one of the said wires, the other terminals thereof connected respectively to independently adjustable contact tips; a movable contact member equipped with a plurality of independently flexible contact portions adapted successively to contact with the respective contact tips; a thermostatic circuit closer; an electro-magnet operatively connected to the said contact member; and a source of current connected in series with the said thermostatic circuit closer and said electromagnet.

6. Heating apparatus, comprising in combination with a pair of current supply wires and a bath, a plurality of electric heating elements disposed in said bath, one terminal of each of said heating elements permanently connected to one of the said wires, the said heating elements arranged in two groups; the other terminals of the heating elements connected respectively to independent contact tips, the contact tips connected to each group of heating elements being independently adjustable; control means subject respectively to the temperature of the bath and of the surrounding air; and connections between the other of said wires and each group of contact tips, the connections for each of said groups controlled respectively by one of the said control means.

7. Heating apparatus, comprising in combination with a pair of current supply wires and a bath, a plurality of electric heating elements disposed in said bath, one terminal of each of said heating elements permanently connected to one of the said wires, the said heating elements arranged in two groups; the other terminals of the heating elements connected respectively to independent contact tips, the contact tips connected to each group of heating elements being independently adjustable; control means subject respectively to the temperature of the bath and of the surrounding air; and connections between the other of said wires and each group of contact tips, the connections for each of said groups controlled respectively by one of said control means, the control tips of each group relatively so disposed with respect to the said connections that the latter will control the circuits through the said tips successively.

8. Heating apparatus, comprising in combination with a pair of current supply wires and a bath, a plurality of electric heating elements disposed in said bath, one terminal of each of said heating elements permanently connected to one of the said wires, the said heating elements arranged in two groups; the other terminals of the heating elements connected respectively to independent contact tips, the contact tips connected to each group of heating elements being independently adjustable; a resistance bridged across the said wires; a pair of thermostats subject respectively to the temperature of the bath and of the surrounding air; an electromagnet in series with each of said thermostats in a circuit shunting a portion of said resistance; and a pair of movable contacts controlled respectively by the said electromagnets and connected to the other of the said wires, said contacts respectively contacting with the one of said groups of tips.

In testimony whereof I have signed my name in presence of two subscribing witnesses.

ACHILLES DE KHOTINSKY.

Witnesses:
 ALBERT SCHEIBLE,
 M. M. BOYLE.